(12) United States Patent
Yoo et al.

(10) Patent No.: US 11,827,126 B2
(45) Date of Patent: Nov. 28, 2023

(54) POWER SUPPLY AND SIGNAL TRANSMISSION DEVICE FOR VEHICLE SEAT RAIL

(71) Applicants: HYUNDAI MOTOR COMPANY, Seoul (KR); KIA Corporation, Seoul (KR); Daechang Seat Co., LTD—Dongtan, Hwaseong-si (KR)

(72) Inventors: So Young Yoo, Suwon-si (KR); Hyeong Jong Kim, Seoul (KR); Han Su Yoo, Hwaseong-si (KR); Seon Chae Na, Yongin-si (KR); Sang Ho Kim, Incheon (KR); Seok Hwan Kim, Suwon-si (KR); Tae Hong Han, Seongnam-si (KR); Sang Yeong Park, Hwaseong-si (KR)

(73) Assignees: HYUNDAI MOTOR COMPANY, Seoul (KR); Kia Corporation, Seoul (KR); Daechang Seat Co., LTD-Dongtan, Hwaseong-si (KR)

( * ) Notice: Subject to any disclaimer, the term of this patent is extended or adjusted under 35 U.S.C. 154(b) by 378 days.

(21) Appl. No.: 17/365,615

(22) Filed: Jul. 1, 2021

(65) Prior Publication Data
US 2022/0289079 A1 Sep. 15, 2022

(30) Foreign Application Priority Data
Mar. 15, 2021 (KR) .......................... 10-2021-0033396

(51) Int. Cl.
*H01R 41/00* (2006.01)
*B60N 2/07* (2006.01)
*B60R 13/08* (2006.01)
*B60N 2/68* (2006.01)
*B60R 16/023* (2006.01)
*B60R 16/03* (2006.01)

(52) U.S. Cl.
CPC ............. *B60N 2/0722* (2013.01); *B60N 2/68* (2013.01); *B60R 13/08* (2013.01); *B60R 16/023* (2013.01); *B60R 16/03* (2013.01); *H01R 41/00* (2013.01); *H01R 2201/26* (2013.01)

(58) Field of Classification Search
CPC ........ B60N 2/0722; B60N 2/68; B60R 13/08; B60R 16/023; B60R 16/03; H01R 41/00; H01R 2201/26
See application file for complete search history.

(56) References Cited

U.S. PATENT DOCUMENTS 7,238,029 B2 * 7/2007 Tsubaki ................ B60R 16/027
296/65.13

* cited by examiner

*Primary Examiner* — Briggitte R. Hammond
(74) *Attorney, Agent, or Firm* — MORGAN, LEWIS & BOCKIUS LLP

(57) ABSTRACT

A power supply and signal transmission device for a vehicle seat rail is provided. The device includes a contact-type power supply unit configured to supply power to an electrical device mounted on a seat, and a contact-type signal transmission unit configured to transfer seat drive control signals. The contact-type power supply unit and the contact-type signal transmission unit are directly mounted on the seat rail.

15 Claims, 8 Drawing Sheets

POWER SUPPLY AND SIGNAL TRANSMISSION DEVICE FOR VEHICLE SEAT RAIL

CROSS-REFERENCE TO RELATED APPLICATION

The present application claims the priority to and the benefit of Korean Patent Application No. 10-2021-0033396, filed Mar. 15, 2021, the entire contents of which are incorporated herein by reference in its entirety.

TECHNICAL FIELD

The present disclosure relates generally to a power supply and signal transmission device for a vehicle seat rail.

BACKGROUND

Generally, a vehicle seat is mounted on a floor panel by means of a seat rail or the like such that the position thereof is adjustable.

In this regard, the seat rail may generally include an upper rail mounted on the lower portion of a seat cushion of the seat and a lower rail fixedly mounted on a floor panel. The upper rail is moved on the lower rail, thereby enabling the position of the seat to be adjusted in the front-rear direction.

In addition, connectors, wiring, and the like for supplying power and transmitting signals to a variety of electrical devices (e.g., a motor for an electric seat, a side airbag, an electric buckle, or a buckle pretensioner) are disposed on the lower portion of the seat cushion.

When the seat is operated to move in the front-rear direction, the wiring or the like that has been covered by the seat cushion may be exposed outward. Furthermore, in a long rail device in which the forward and backward movement stroke (or travel) of the seat is increased such that the seat is movable to an intended position in the cabin, the wiring or the like that has been covered by the seat cushion may be exposed more.

Consequently, when the wiring exposed outward is damaged by an external load (e.g., being stepped on by an occupant or being in friction contact with luggage), the intended function of the electric seat may be lost. In addition, the occupant may be damaged by interference with the wiring and the usability or the like of the internal space of the cabin may be reduced.

The foregoing is intended merely to aid in the understanding of the background of the present disclosure, and is not intended to mean that the present disclosure falls within the purview of the related art that is already known to those skilled in the art.

SUMMARY

Accordingly, the present disclosure provides a power supply and signal transmission device for a vehicle seat rail in which a contact-type power supply unit configured to supply power to an electrical device mounted on a seat and a contact-type signal transmission unit configured to transfer seat drive control signals are directly mounted on the seat rail, such that conventional wiring or connectors may be omitted, thereby preventing problems caused by the exposure of the wiring.

In one aspect of the present disclosure, there is provided a power supply and signal transmission device for a vehicle seat rail including a lower rail fixedly mounted on a floor panel and an upper rail mounted on a seat cushion frame and fastened to the lower rail such that the upper rail is movable on the lower rail. The power supply and signal transmission device may include: a contact-type power supply unit configured to supply power to an electrical device by constant contact with a power source; and a contact-type signal transmission unit configured to transmit control signals to the electrical device by constant contact with a signal source, wherein the contact-type power supply unit and the contact-type signal transmission unit are directly mounted on opposing surfaces of the lower rail and the upper rail.

The contact-type power supply unit may include: an insulation cover attached to one plate from among side and bottom plates of the lower rail; a positive electrode plate and a negative electrode plate attached to inner surface portions of the insulation cover, spaced apart from each other, and conductively connected to the power source; brush covers attached to one plate from among side and bottom plates of the upper rail; and a positive brush and a negative brush mounted within the brush covers, conductively connected to the electrical device, and in constant contact with the positive electrode plate and the negative electrode plate.

The insulation cover may include receptacles provided on both sides thereof, each of the receptacles having an open top structure, with a positive electrode plate and a negative electrode plate connected to a power source being fixedly inserted into the receptacles, respectively.

The insulation cover may include a plurality of drain holes and a mounting hole provided in a bottom plate thereof, between the receptacles.

Particularly, each of the positive electrode plate and the negative electrode plate may be a bus bar made from a conductive metal material and having a rectangular plate shape.

Particularly, each of the positive electrode brush and the negative brush may include a carbon brush made from a conductive carbon material.

The contact-type power supply unit may further include: holders detachably inserted into the brush covers, with the positive brush and the negative brush being fixedly inserted into lower portions thereof, respectively; and springs each connected to a rear plate of each of the brush covers and to a corresponding holder of the holders.

The contact-type signal transmission unit may include: an insulation cover attached to one plate from among side and bottom plates of the lower rail; a main PCB attached to an inner surface portion of the insulation cover and conductively connected to the signal source; and PCB covers attached to one plate from among top, side, and bottom plates of the upper rail; and signal transfer PCBs mounted within the PCB covers, respectively, connected to the electrical device such that signals are transmittable therebetween, and in constant contact with conductive patterns of the main PCB.

The power supply and signal transmission device may further include: a first bracket mounted on an outer surface portion of a side plate of the lower rail; and a second bracket mounted on a seat cushion frame fastening plate of the upper rail so as to face the first bracket, such that the contact-type power supply unit or the contact-type signal transmission unit is mounted on the first bracket and the second bracket.

Thus, when the contact-type power supply unit is mounted opposing surfaces of the first bracket and the second bracket, the contact-type signal transmission unit may be mounted on opposing surfaces of the lower rail and the upper rail.

In contrast, when the contact-type signal transmission unit is mounted opposing surfaces of the first bracket and the second bracket, the contact-type power supply unit may be mounted on opposing surfaces of the lower rail and the upper rail.

In some forms of the present disclosure, when the seat rail is a pair of seat rails consisting of a left seat rail and a right seat rail, the contact-type power supply unit configured to supply power to the electrical device by constant contact with the power source may be mounted on opposing surfaces of the lower rail and the upper rail of one seat rail of the pair of seat rails, and the contact-type signal transmission unit configured to transmit control signals to the electrical device by constant contact with the signal source may be mounted on opposing surfaces of the lower rail and the upper rail of the other seat rail of the pair of seat rails.

In some forms of the present disclosure, the following effects are provided.

First, the contact-type power supply unit configured to supply power to the electrical device mounted on the seat and the contact-type signal transmission unit configured to transfer seat drive control signals are directly mounted on the seat rail, such that conventional wiring or connectors may be omitted.

Second, due to the conventional wiring or connectors being omitted, it is possible to prevent an occupant from being injured by the exposure of the wiring and improve the usability of the internal space of the cabin.

DRAWINGS

The above and other objectives, features, and other advantages of the present disclosure will be more clearly understood from the following detailed description when taken in conjunction with the accompanying drawings, in which.

DETAILED DESCRIPTION

Hereinafter, some forms of the present disclosure will be described in detail with reference to the accompanying drawings.

A seat rail for a vehicle includes a lower rail fixedly mounted on a floor panel and an upper rail mounted on a seat cushion frame and fastened to the lower rail such that the upper rail is movable on the lower rail.

The present disclosure provides that a contact-type power supply unit configured to supply power to an electrical device by constant contact with a power source (e.g., the battery) and a contact-type signal transmission unit configured to transmit control signals to the electrical device by constant contact with a signal source (e.g., a controller) are directly mounted on opposing surfaces of the lower rail and the upper rail.

Figure 1:
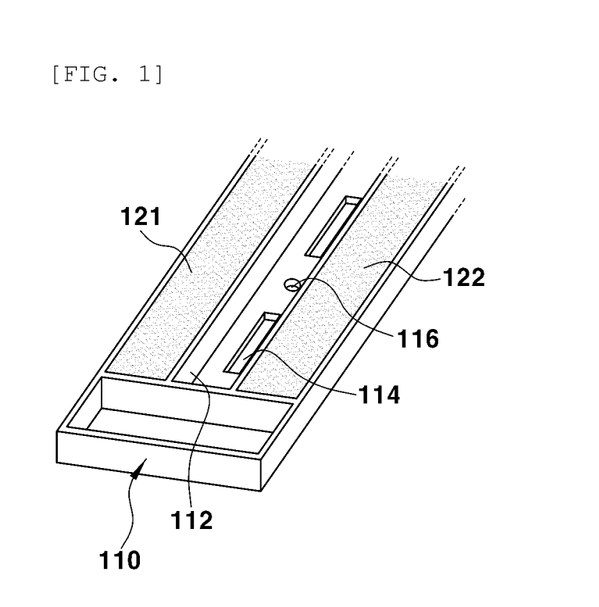
FIG. 1 a perspective view illustrating an insulation cover and electrode plates attached to the insulation cover among components of a contact-type power supply unit for a seat rail in some forms of the present disclosure.
Figure 2:
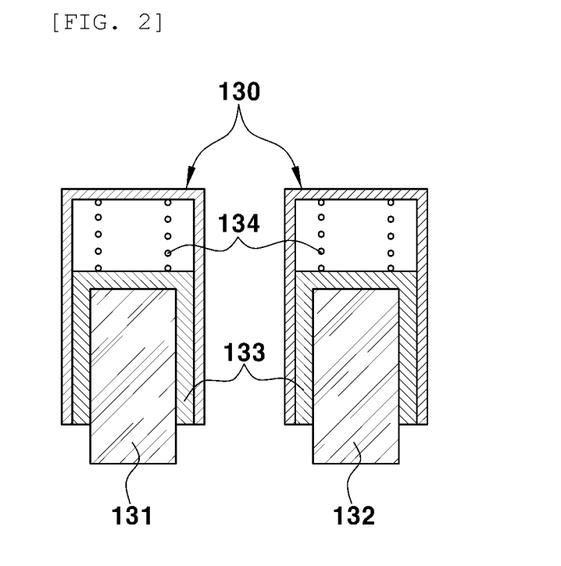
FIG. 2 is a cross-sectional view illustrating a structure of brush covers and brushes inserted into the brush covers among the components of the contact-type power supply unit for a seat rail in some forms of the present disclosure.

In the accompanying drawings, FIG. 1 illustrates an insulation cover and electrode plates attached to the insulation cover among components of a contact-type power supply unit for a seat rail according to the present disclosure, and FIG. 2 illustrates a structure of brush covers and brushes inserted into the brush covers.

As illustrated in FIG. 1, an insulation cover 110 forming a component of the contact-type power supply unit has a plate structure, the length of which is similar to the length of the lower rail. The insulation cover 110 is fabricated into a structure in which receptacles 112 each having an open top structure are provided on both sides of the insulation cover 110, such that a positive (+) electrode plate 121 and a negative (−) electrode plate 122 connected to a power source (e.g., a battery) are fixedly inserted into the receptacles 112, respectively.

In addition, a plurality of drain holes 114 through which moisture and impurities are discharged and a mounting hole 116 for coupling with the lower rail are provided in a bottom plate of the insulation cover 110, more specifically, portions of the bottom plate located between the walls of the receptacles 112.

The positive electrode plate 121 and the negative electrode plate 122 each having a rectangular plate shape are fixedly inserted into the receptacles 112 of the insulation cover 110. Each of the positive electrode plate 121 and the negative electrode plate 122 is fabricated from a copper (Cu) material from among conductive metal materials into a bus bar structure so as to be connected to the power source (e.g., the battery).

The insulation cover 110, into which the positive electrode plate 121 and the negative electrode plate 122 are fixedly inserted, may be attached to the inner surface of one plate selected from among a top plate, side plates, and a bottom plate of the lower rail of a seat rail.

As illustrated in FIG. 2, the contact-type power supply unit includes brush covers 130 attached to one plate selected from among a top plate, side plates, and a bottom plate of the upper rail and a positive (+) brush 131 and a negative (−) brush 132 in conductive contact with the positive electrode plate 121 and negative electrode plate 122 so as to supply power to an electrical device.

More specifically, each of the brush covers 130 has the shape of a circular or quadrangular cylinder and is mounted on one plate selected from among the top plate, the side plates, and the bottom plate of the upper rail. The positive brush 131 and the negative brush 132 are fabricated as carbon brushes made from a conductive carbon material and are detachably inserted into the brush covers 130, respectively, such that the brushes 131 and 132 may be introduced into and withdrawn from the brush covers.

Particularly, in order to protect the positive brush 131 and the negative brush 132, the positive brush 131 and the negative brush 132 are fixedly inserted into individual holders 133, respectively, and the holders 133 are detachably inserted into the brush covers 130.

More particularly, a spring 134 is connected to the rear plate of each of the brush covers 130 and to the corresponding holder 133 such that the spring 134 may be compressed, whereby the bottom ends of the positive brush 131 and the negative brush 132 fixed to the holders 133 protrude from the brush covers 130.

Thus, due to the elastic restorative force of the springs 134 acting on the holders 133, the bottom ends of the positive brush 131 and the negative brush 132 fixed to the holders 133 protrude from the brush covers 130. Consequently, the bottom ends of the positive brush 131 and the negative brush 132 that have protruded may be in constant conductive contact with the positive electrode plate 121 and the negative electrode plate 122, respectively.

Thus, since the positive brush 131 and the negative brush 132 connected to the electrical device (e.g., a motor of the electric seat) are in constant contact with the positive electrode plate 121 and the negative electrode plate 122 connected to the power source (e.g., the battery), power may be supplied to the electrical device.

Figure 3:
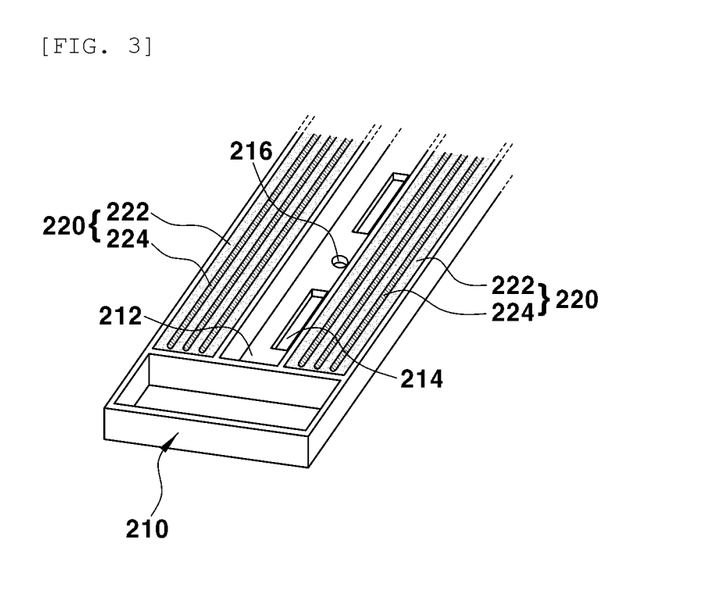
FIG. 3 is a perspective view illustrating an insulation cover and a main PCB disposed in the insulation cover among the components of the contact-type signal transmission unit for a seat rail in some forms of the present disclosure.
Figure 4:
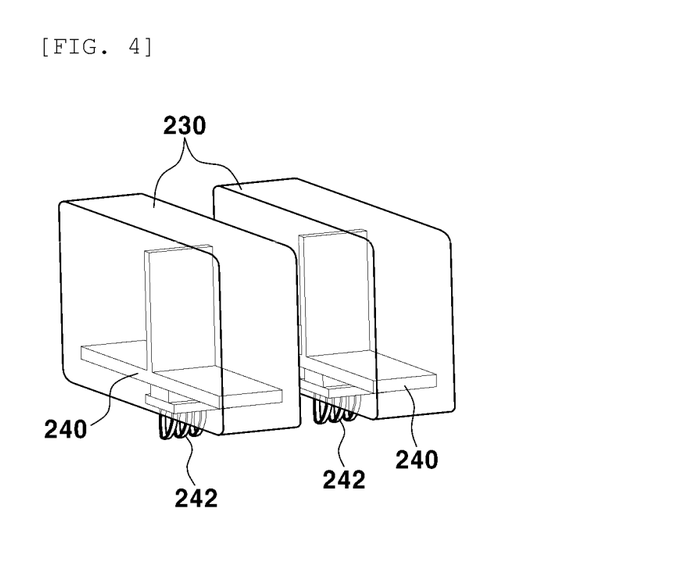
FIG. 4 is a perspective view illustrating PCB covers and signal transfer PCBs disposed in the PCB covers.

In the accompanying drawings, FIG. 3 illustrates an insulation cover and a main PCB disposed in the insulation cover among the components of the contact-type signal transmission unit for a seat rail according to the present disclosure, and FIG. 4 illustrates PCB covers and signal transfer PCBs disposed in the PCB covers.

As illustrated in FIG. 3, the insulation cover 210 forming a component of the contact-type signal transmission unit has the structure of a plate, the length of which is similar to the length of the lower rail. The insulation cover 210 is fabricated into a structure in which receptacles 212 each having an open top structure are provided on both sides of the insulation cover 210, such that sections of a main printed circuit board (PCB) 220 connected to the signal source (e.g., the controller) are fixedly inserted into the receptacles 212.

In addition, a plurality of drain holes 214 through which moisture and impurities are discharged and a mounting hole 216 for coupling with the lower rail are provided in a bottom plate of the insulation cover 210, more specifically, portions of the bottom plate located between the walls of the housing 212.

Each section of the main PCB 220 fabricated into a rectangular plate shape is fixedly inserted into the housing 212 of the insulation cover 210. Each section of the main PCB 220 is fabricated into a structure in which a conductive pattern 224 made from Cu is formed on an insulating resin layer 222 as is well known. A portion of the conductive pattern 224 is connected to a signal source (e.g., the controller).

The insulation cover 210, into which the main PCB 220 is fixedly inserted as described above, may be attached to the inner surface of one plate from among the top plate, the side plates, and the bottom plate of the lower rail of the seat rail.

As illustrated in FIG. 4, the contact-type signal transmission unit includes PCB covers 230 attached to one plate from among the top plate, the side plates, and the bottom plate of the upper rail and signal transfer PCBs 240 in conductive contact with the sections of the main PCB 220 and configured to transmit control signals to the electrical device.

More specifically, each of the PCB covers 230 has the shape of a circular or quadrangular cylinder and is mounted on one plate selected from among the top plate, the side plates, and the bottom plate of the upper rail. Each of the signal transfer PCBs 240 has a structure in which a contact terminal 242 protrudes from the bottom thereof and remains in constant contact with the conductive pattern 224 of the main PCB 220. The signal transfer PCBs 240 are fixedly mounted within the PCB covers 230, respectively.

Thus, due to the contact terminals 242 of the signal transfer PCBs 240 connected to the electrical device (e.g., the motor of the electric seat) being in constant contact with the conductive patterns 224 of the main PCB 220 connected to the signal source (e.g., the controller), control signals from the signal source may be transmitted to the electrical device.

Hereinafter, an example in which the contact-type power supply unit and the contact-type signal transmission unit in some forms of the present disclosure are disposed on the seat rail will be described as follows.

Figure 5:
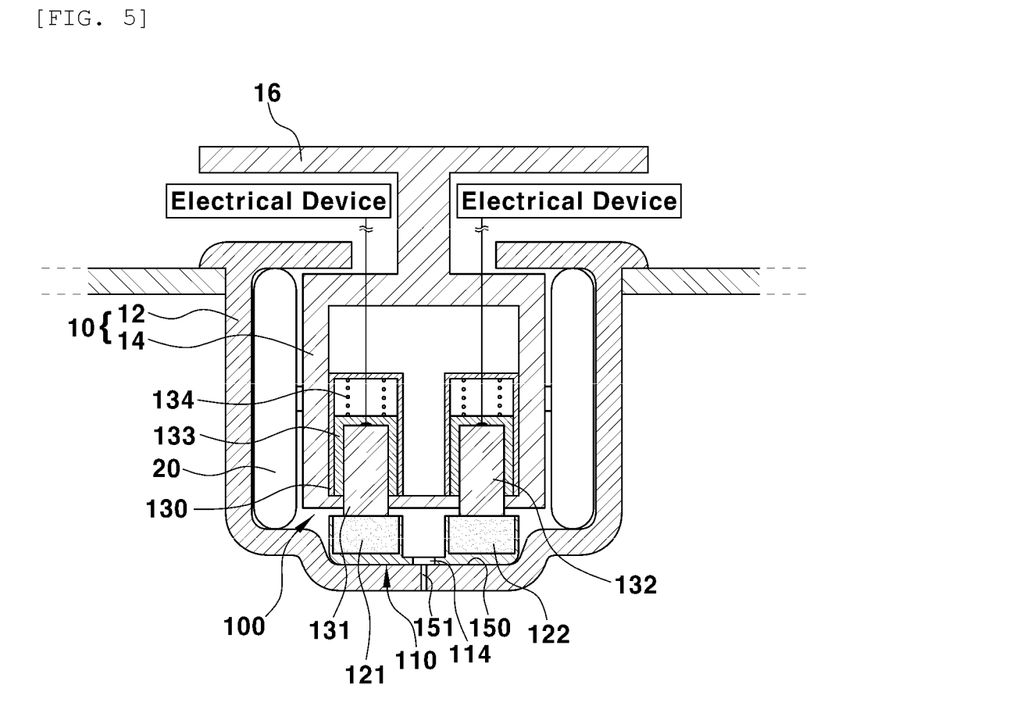
FIG. 5 is a cross-sectional view illustrating an example in which the contact-type power supply unit in some forms of the present disclosure is mounted on one of a pair of seat rails.
Figure 6:
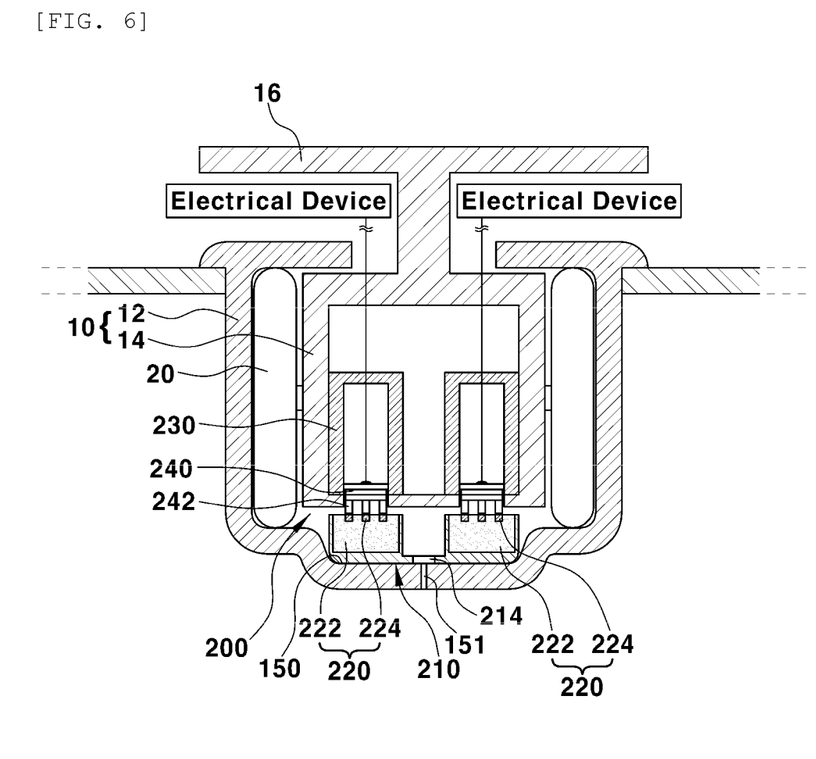
FIG. 6 is a cross-sectional view illustrating an example in which the contact-type signal transmission unit in some forms of the present disclosure is mounted on the other of the pair of seat rails.

In the accompanying drawings, FIG. 5 is a cross-sectional view illustrating an example in which the contact-type power supply unit according to the present disclosure is mounted on one of a pair of seat rails, and FIG. 6 is a cross-sectional view illustrating an example in which the contact-type signal transmission unit according to the present disclosure is mounted on the other of the pair of seat rails.

In general, a seat rail 10 for a vehicle includes a lower rail 12 fixedly mounted on a floor panel and an upper rail 14 mounted on a seat cushion frame and fastened to the lower rail 12 such that the upper rail is movable on the lower rail. Rollers 20 performing a rolling operation on the lower rail 12 may be mounted on both sides of the upper rail 14.

When a pair of seat rails 10 including a left seat rail and a right seat rail is provided, a contact-type power supply unit 100 supplying power to the electrical device by constant contact with a power source may be mounted on opposing surfaces of the lower rail 12 and the upper rail 14 of one seat rail 10 of the pair of seat rails 10 as illustrated in FIG. 5, and a contact-type signal transmission unit 200 transmitting control signals to the electrical device by constant contact with a signal source may be mounted on opposing surfaces of the lower rail 12 and the upper rail 14 of the other seat rail 10 of the pair of seat rails 10 as illustrated in FIG. 6.

Referring to FIG. 5, the contact-type power supply unit 100 may include the insulation cover 110 mounted on the bottom plate of the lower rail 12, the positive electrode plate 121 and the negative electrode plate 122 fixedly inserted into the receptacles 112 of the insulation cover 110, the brush covers 130 mounted on the side plates and the bottom plate of the upper rail 14, the holders 133 inserted into the brush covers 130 and elastically supported by the springs 134, and the positive brush 131 and the negative brush 132 fixedly inserted into the holders 133.

Here, the bottom portions of the positive brush 131 and the negative brush 132 remain in constant conductive contact with the positive electrode plate 121 and the negative electrode plate 122, respectively.

Thus, current from the power source (e.g., the battery) may be easily supplied to the electrical device (e.g., the motor of the electric seat) through the positive brush 131 and the negative brush 132 after having flowed through the positive electrode plate 121 and the negative electrode plate 122 without separate wiring.

Referring to FIG. 6, the contact-type signal transmission unit 200 may include the insulation cover 210 mounted on the bottom plate of the lower rail 12, the main PCB 220 fixedly inserted into the housing 212 of the insulation cover 210, the PCB covers 230 mounted on the side plates and the bottom plate of the upper rail 14, and the signal transfer PCBs 240 each having the contact terminal 242 fixed within the corresponding PCB cover 230.

Here, the contact terminals 242 of the signal transfer PCBs 240 remain in constant contact with the conductive patterns 224 of the main PCB 220 such that signals may be transmitted therebetween.

Thus, control signals or the like from the signal source (e.g., the controller) may be easily transmitted to the electrical device (e.g., the motor of the electric seat) through the main PCB 220 and the signal transfer PCBs 240 without separate wiring.

In addition, when the seat rail 10 is applied as a monorail having a long rail structure, the contact-type power supply unit 100 and the contact-type signal transmission unit 200 may be mounted on a single seat rail.

Figure 7:
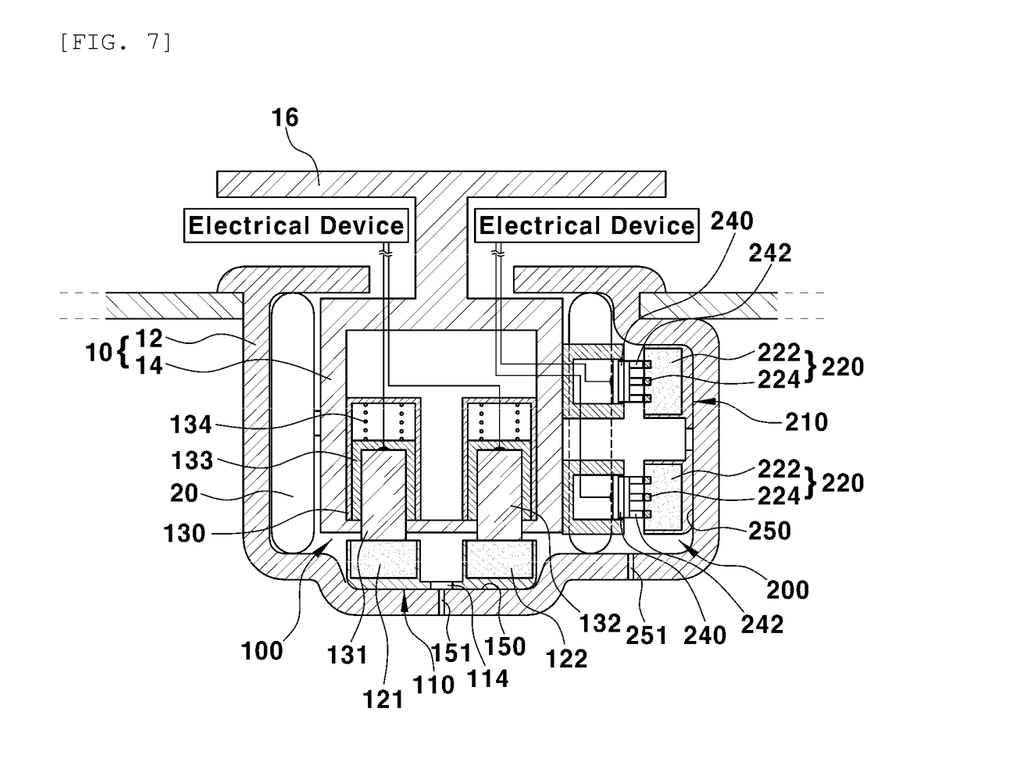
FIGS. 7 and 8 are cross-sectional views illustrating examples in which the contact-type power supply unit and the contact-type signal transmission unit in some forms of the present disclosure are mounted on a single seat rail.
Figure 8:
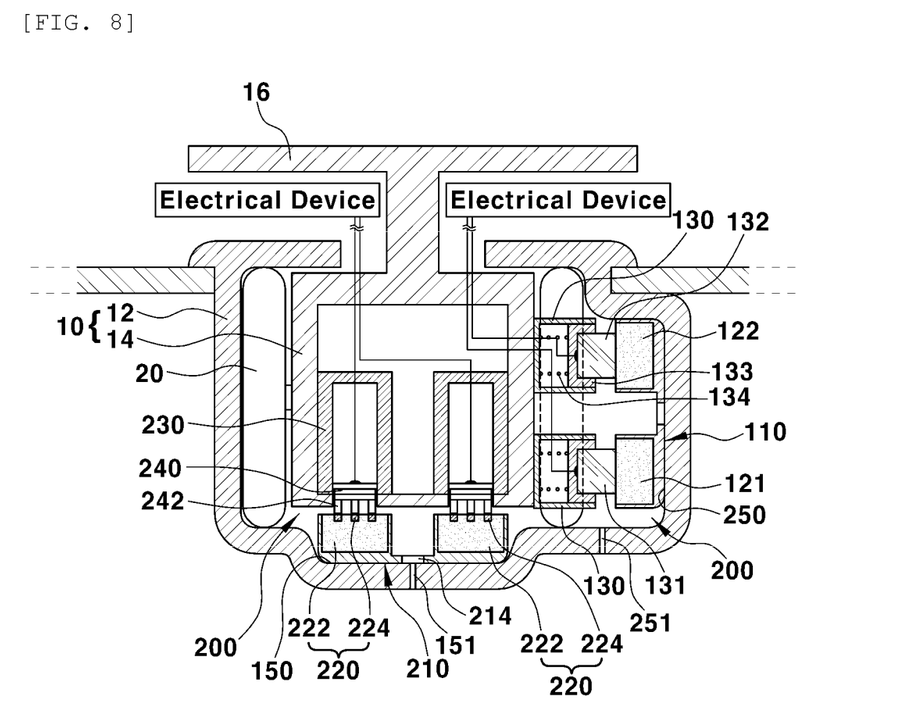

In the accompanying drawings, FIGS. 7 and 8 are cross-sectional views illustrating examples in which the contact-type power supply unit and the contact-type signal transmission unit in some forms of the present disclosure are mounted on a single seat rail.

As illustrated in FIG. 7, the contact-type power supply unit 100 may be mounted on the lower portions of the lower rail 12 and the upper rail 14, and the contact-type signal transmission unit 200 may be mounted on side portions of the lower rail 12 and the upper rail 14.

Alternatively, as illustrated in FIG. 8, the contact-type power supply unit 100 may be mounted on side portions of the lower rail 12 and the upper rail 14, and the contact-type signal transmission unit 200 may be mounted on the lower portions of the lower rail 12 and the upper rail 14.

Referring to FIGS. 7 and 8, the contact-type power supply unit 100 may include the insulation cover 110 mounted on the bottom plate of the lower rail 12, the positive electrode plate 121 and the negative electrode plate 122 fixedly inserted into the receptacles 112 of the insulation cover 110, the brush covers 130 mounted on the side plates and the bottom plate of the upper rail 14, the holders 133 inserted into the brush covers 130 and elastically supported by the springs 134.

Here, the bottom portions of the positive brush 131 and the negative brush 132 remain in constant conductive contact with positive electrode plate 121 and the negative electrode plate 122, respectively.

Thus, current from the power source (e.g., the battery) may be easily supplied to the electrical device (e.g., the motor of the electric seat) through the positive brush 131 and the negative brush 132 after having flowed through the positive electrode plate 121 and the negative electrode plate 122 without separate wiring.

Referring to FIGS. 7 and 8, the contact-type signal transmission unit 200 may include the insulation cover 210 mounted on the bottom plate of the lower rail 12, the main PCB 220 fixedly inserted into the housing 212 of the insulation cover 210, the PCB covers 230 mounted on the side plates and the bottom plate of the upper rail 14, and the signal transfer PCBs 240 having the contact terminals 242 fixed within the PCB covers 230.

Here, the contact terminals 242 of the signal transfer PCBs 240 remain in constant contact with the conductive patterns 224 of the main PCB 220 such that signals may be transmitted therebetween.

Thus, control signals or the like from the signal source (e.g., the controller) may be easily transmitted to the electrical device (e.g., the motor of the electric seat) through the main PCB 220 and the signal transfer PCBs 240 without separate wiring.

In addition, the bottom plate of the lower rail 12 may have a lower expansion space 150 convex in the bottom direction such that the above-described components of the contact-type power supply unit 100 or the contact-type signal transmission unit 200 may be disposed therein.

Alternatively, the side plate of the lower rail 12 may have a side expansion space 250 convex in the outward direction such that the above-described components of the contact-type power supply unit 100 or the contact-type signal transmission unit 200 may be disposed therein.

Particularly, a drain hole 151 through which moisture is discharged may be formed in the bottom plate of the lower rail 12, and a drain hole 251 through which moisture is discharged may be formed in the bottom of the side plate of the lower rail 12.

In some forms of the present disclosure, the contact-type power supply unit 100 or the contact-type signal transmission unit 200 may be mounted on an outer side portion of the seat rail using a bracket.

Figure 9:
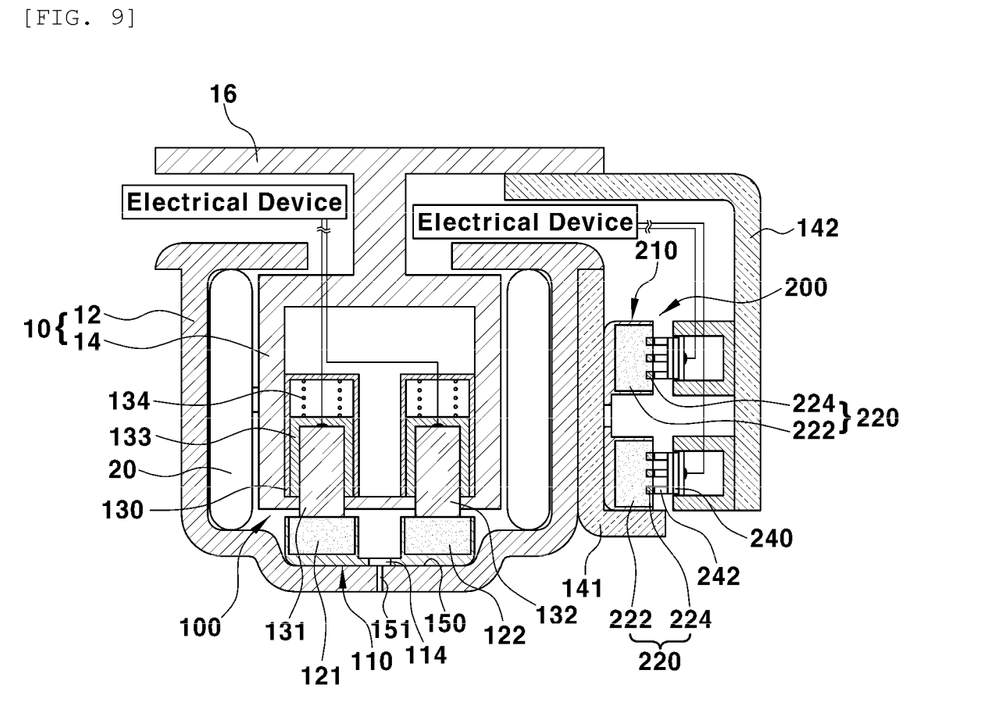
FIGS. 9 and 10 are cross-sectional views illustrating examples in which the contact-type power supply unit or the contact-type signal transmission unit in some forms of the present disclosure are mounted on brackets separately mounted on the seat rail.
Figure 10:
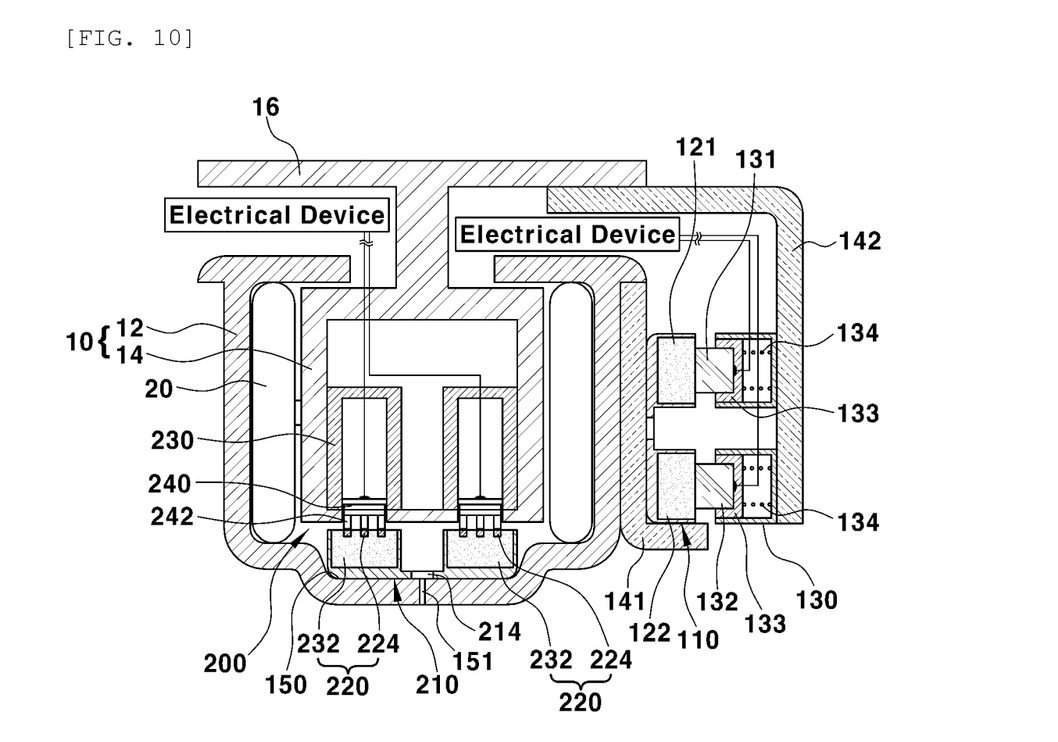

In the accompanying drawings, FIGS. 9 and 10 are cross-sectional views illustrating examples in which the contact-type power supply unit or the contact-type signal transmission unit in some forms of the present disclosure are mounted on brackets separately mounted on the seat rail.

As illustrated in FIGS. 9 and 10, a first bracket 141 may be mounted on an outer surface of the side plate of the lower rail 12 and a second bracket 142 may be mounted on a seat cushion frame fastening plate 16 of the upper rail 14 so as to face the first bracket 141, such that the contact-type power supply unit 100 or the contact-type signal transmission unit 200 may be mounted thereon.

Thus, the contact-type power supply unit 100 or the contact-type signal transmission unit 200 may be mounted on opposing surfaces of the first the first bracket 141 and the second bracket 142.

Referring to FIG. 9, when the contact-type power supply unit 100 is mounted on the opposing surfaces of the first the first bracket 141 and the second bracket 142, the contact-type signal transmission unit 200 may be mounted on opposing surfaces of the lower rail 12 and the upper rail 14.

In contrast, referring to FIG. 10, when the contact-type signal transmission unit 200 is mounted on opposing surfaces of the first the first bracket 141 and the second bracket 142, the contact-type power supply unit 100 may be mounted on opposing surfaces of the lower rail 12 and the upper rail 14.

As described above, even though that the contact-type power supply unit 100 or the contact-type signal transmission unit 200 is mounted on the outer side portion of the seat rail using the brackets, current from the power source (e.g., the battery) may be easily supplied to the electrical device (e.g., the motor of the electric seat) through the positive brush 131 and the negative brush 132 after having flowed through the positive electrode plate 121 and the negative electrode without separate wiring, and control signals or the like from the signal source (e.g., the controller) may be easily transmitted to the electrical device (e.g., the motor of the electric seat) through the main PCB 220 and the signal transfer PCBs 240 without separate wiring.

As set forth above, the contact-type power supply unit 100 configured to supply power to the electrical device mounted on the seat and the contact-type signal transmission unit 200 configured to transfer seat drive control signals are directly mounted on the seat rail 10. Accordingly, conventional wiring or connectors may be omitted, thereby preventing an occupant from being injured by the exposure of the wiring and improving the usability of the internal space of the cabin.

What is claimed is:

1. A power supply and signal transmission device for a vehicle seat rail including a lower rail fixedly mounted on a floor panel and an upper rail mounted on a seat cushion frame and fastened to the lower rail to move the upper rail on the lower rail, the power supply and signal transmission device comprising:
   a contact-type power supply unit configured to supply power to an electrical device by constant contact with a power source; and
   a contact-type signal transmission unit configured to transmit control signals to the electrical device by constant contact with a signal source,
   wherein the contact-type power supply unit and the contact-type signal transmission unit are directly mounted on opposing surfaces of the lower rail and the upper rail.

2. The power supply and signal transmission device of claim 1, wherein the contact-type power supply unit further comprises:
   an insulation cover attached to one plate from among side and bottom plates of the lower rail;
   a positive electrode plate and a negative electrode plate attached to inner surface portions of the insulation cover, spaced apart from each other, and conductively connected to the power source;
   brush covers attached to one plate from among side and bottom plates of the upper rail; and
   a positive brush and a negative brush mounted within the brush covers, conductively connected to the electrical device, and in constant contact with the positive electrode plate and the negative electrode plate.

3. The power supply and signal transmission device of claim 2, wherein the insulation cover comprises:
   receptacles provided on both sides of the insulation cover, each of the receptacles having an open top structure, wherein a positive electrode plate and a negative electrode plate connected to a power source fixedly inserted into the receptacles, respectively.

4. The power supply and signal transmission device of claim 3, wherein the insulation cover comprises:
   a plurality of drain holes; and
   a mounting hole provided in a bottom plate of the insulation cover between the receptacles.

5. The power supply and signal transmission device of claim 2, wherein each of the positive electrode plate and the negative electrode plate comprises:
   a bus bar made from a conductive metal material and having a rectangular plate shape.

6. The power supply and signal transmission device of claim 2, wherein each of the positive electrode brush and the negative brush comprises:
   a carbon brush made from a conductive carbon material.

7. The power supply and signal transmission device of claim 2, wherein the contact-type power supply unit further comprises:
   a plurality of holders detachably inserted into the brush covers, wherein the positive brush and the negative brush are fixedly inserted into lower portions of the brush covers, respectively; and
   a plurality of springs, wherein each spring is connected to a rear plate of each of the brush covers and to a corresponding holder of the plurality of holders.

8. The power supply and signal transmission device of claim 1, wherein the contact-type signal transmission unit further comprises:
   an insulation cover attached to one plate from among side and bottom plates of the lower rail;
   a main printed circuit board (PCB) attached to an inner surface portion of the insulation cover and conductively connected to the signal source;
   PCB covers attached to one plate from among top, side, and bottom plates of the upper rail; and
   signal transfer PCBs mounted within the PCB covers connected to the electrical device to transmit signals, and in constant contact with conductive patterns of the main PCB.

9. The power supply and signal transmission device of claim 1, further comprising:
   a first bracket mounted on an outer surface portion of a side plate of the lower rail; and
   a second bracket mounted on a seat cushion frame fastening plate of the upper rail to face the first bracket,
   wherein the contact-type power supply unit or the contact-type signal transmission unit is mounted on the first bracket and the second bracket.

10. The power supply and signal transmission device of claim 9, wherein:
    when the contact-type power supply unit is mounted on opposing surfaces of the first bracket and the second bracket, the contact-type signal transmission unit is mounted on opposing surfaces of the lower rail and the upper rail.

11. The power supply and signal transmission device of claim 9, wherein:
    when the contact-type signal transmission unit is mounted on opposing surfaces of the first bracket and the second bracket, the contact-type power supply unit is mounted on opposing surfaces of the lower rail and the upper rail.

12. The power supply and signal transmission device of claim 1, wherein:
    the contact-type power supply unit is configured to supply power to the electrical device by constant contact with the power source, wherein the contact-type power supply unit is mounted on opposing surfaces of the lower rail and the upper rail of a first seat rail included in the vehicle seat rail; and
    the contact-type signal transmission unit is configured to transmit control signals to the electrical device by constant contact with the signal source, wherein the contact-type signal transmission unit is mounted on opposing surfaces of the lower rail and the upper rail of a second seat rail included in the vehicle seat rail.

13. The power supply and signal transmission device of claim 1, wherein the lower rail further comprises:
    a lower expansion space provided on a bottom plate of the lower rail, wherein the lower expansion space is convex in a bottom direction, and the contact-type power supply unit or the contact-type signal transmission unit is disposed in the lower expansion space.

14. The power supply and signal transmission device of claim 1, wherein the lower rail further comprises:
    a side expansion space provided on a side plate of the lower rail, wherein the side expansion space is convex in an outward direction, and the contact-type power supply unit or the contact-type signal transmission unit is disposed in the side expansion space.

15. The power supply and signal transmission device of claim 1, wherein the lower rail further comprises:
a plurality of drain holes provided in a bottle plate and a side plate, wherein the plurality of drain holes discharges moisture.

\* \* \* \* \*